Aug. 7, 1962    J. S. PERRYMAN    3,048,050
OSCILLATING SERVOMOTOR
Filed Jan. 23, 1959

INVENTOR
JOHN S. PERRYMAN
BY *William V. Ebs*
HIS ATTORNEY

3,048,050
OSCILLATING SERVOMOTOR

John S. Perryman, Fayson Lakes, N.J., assignor to Curtiss-Wright Corporation, a corporation of Delaware
Filed Jan. 23, 1959, Ser. No. 788,625
5 Claims. (Cl. 74—388)

In general, my invention relates to servomotors. More particularly, the invention is directed to a servomotor which has a natural frequency of oscillation.

The device of the invention includes as essential components an error differential, a bi-directional clutch and brake, transmission mechanism and mechanical output position feedback means. The device operatees continuously, even in the absence of an input signal, to produce an oscillatory output motion. The transmission mechanism functions to cause an output member to move first in one direction and then in another according to the operation of the bi-directional clutch and brake which is controlled through the feedback means. In the absence of an input signal no net output movement results. However, the servomotor responds to an input signal operative upon the clutch to produce an output motion directly proportional to the input signal. The device is connected to a power input source which enables the servomotor to function as a power amplifier.

It is common practice in the design of servomechanisms to attempt to reduce oscillatory motion in the output to a minimum. This is in contrast to the device of the invention which seeks to take advantage of oscillations in the output. Indeed, a prime object of the invention is to provide an improved mechanical servomotor having a frequency of oscillation such that the device is dynamically fluid and friction levels between moving parts are reduced to a minimum.

Another object of the invention is to provide an improved servomotor wherein delays in output motion following an input signal are reduced to a minimum.

Another object of the invention is to provide such a servomotor, which includes means for amplifying input power such that the mechanism may be used in the moving of substantial loads.

Other objects and advantages of the invention will become apparent during a reading of the specification taken in connection with the drawings in which similar reference characters refer to similar parts in the several views.

Referring to the drawings.

Figure 1:
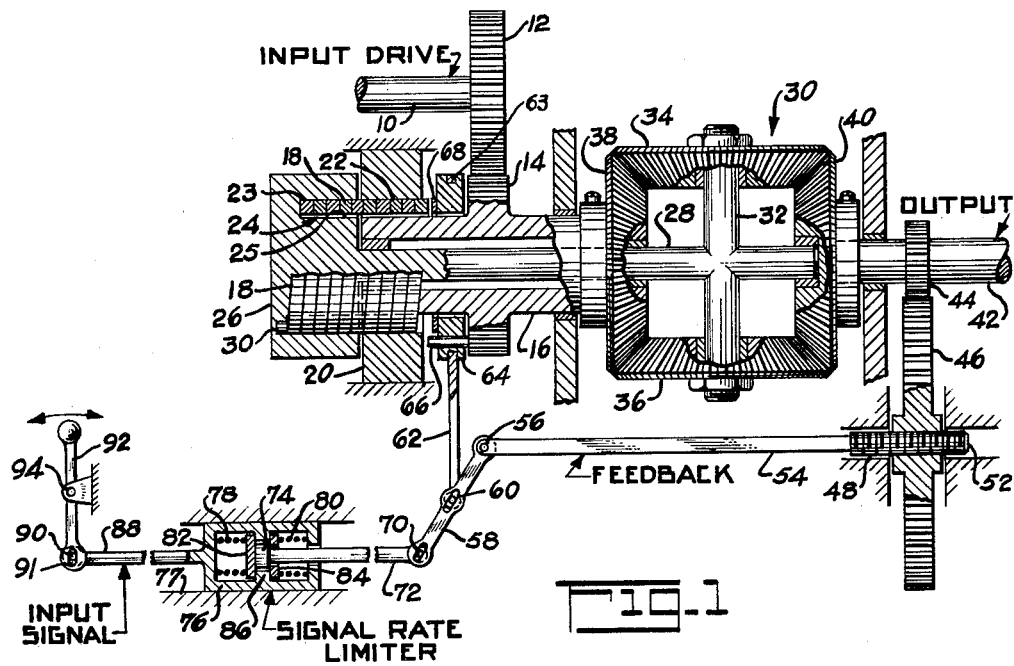
FIG. 1 is a side elevational view, partially in section, showing the device of the invention in somewhat diagrammatic form.
Figure 2:
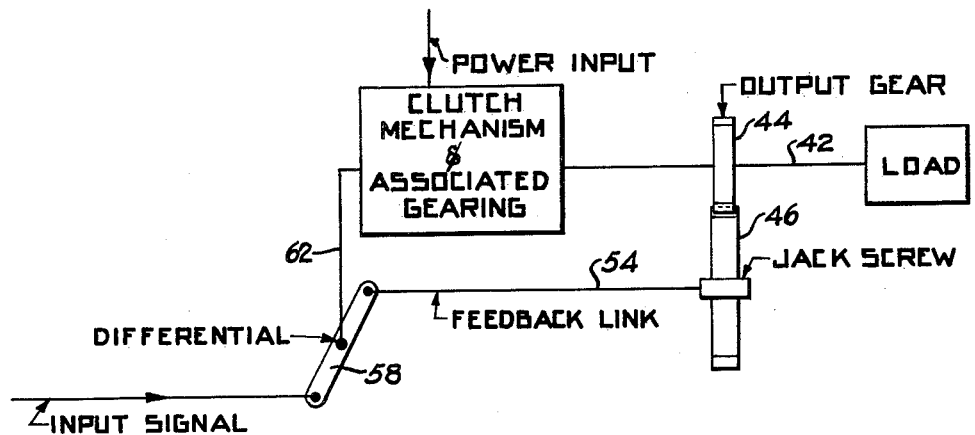
FIG. 2 is a block diagram of the device.

In the drawings reference character 10 denotes an input drive shaft which connects with a power source (not shown). Mounted on the shaft 10 is an input driving gear 12 which meshes with a gear 14 on hollow shaft 16. It is intended that the input drive be uni-directional such that shafts 10 and 16 are always rotated in one direction. Preferably the input drive speed is maintained constant.

A spring 18 surrounds a portion of the shaft 16. This spring 18 is a precision wound and ground helical clutch spring of the type which will tighten or loosen its grip on cylindrical surfaces when wound or unwound. At times, the spring has an interference fit with a fixed ring 20, being wound somewhat before it is assembled in the device so that the spring when unrestrained will expand of its own accord in the device into tight fitting engagement with the inside surface 22 of the ring 20. The spring 18 and ring 20 constitute the spring clutch and brake means of the device. The part played by such clutch and brake means in the operation of the servomotor will be made clear hereinafter. One end of the spring 18 is mounted in an annular slot 24, and when the spring engages inside surface 22 of the ring 20 it also engages the outside surface 23 of the slot 24. As shown the slot 24 is located in an extension 26 of a shaft 28. The spring 18 winds up in the same direction as the rotation of shaft 16. A tang 30 rotationally secures the one end of the spring extending in the slot 24 to the extension 26. The other end of the spring is not permanently tied to any member of the device.

The shaft 28 is concentric with and extends through the shaft 16. As stated, the shaft 28 has the extension 26 at one end. At the other end of the shaft is a spider 30, the spider comprising a rod 32 having bevel gears 34 and 36 rotationally mounted on opposite ends thereof. The gears 34 and 36 respectively mesh with a gear 38 on shaft 16 and a gear 40 on output shaft 42. Affixed to the output shaft 42 is an output gear 44 which meshes with teeth of a gear wheel 46. As shown, the gear wheel 46 is rotationally mounted on jack screw 48, having threads 52 which engage internal threads in the wheel.

The jack screw 48 is an integral part of a feedback link 54 and is located at one end thereof. The other end of the link 54 is pivotally connected at 56 to one end of a differential link 58. The link includes a slot 60 at an intermediate point, and pivotally mounted in the slot is an integral extension 62 of a ring 63. The ring 63 is mounted in the annular slot of a ring member 64 such that the ring member 64 may be rotated even though the ring 63 is rotationally fixed. The ring member 64 is mounted for axial movement and rotation on shaft 16. A pin 66 on the face of gear 14 extends through an opening in the ring 64 to guide the ring for axial movement and to impart rotation of the shaft 16 to the ring. Axial movement of the ring is very small in amount during the operation of the device, but performs an important function inasmuch as it provides for the engagement and disengagement of a frictional surface 68 on the ring with the spring end. This engagement and disengagement of the frictional surface 68 with the spring, controls the direction of motion of the output shaft 42.

As noted, one end of the differential link 58 pivotally connects with the link 54. The other end of the differential link includes a slot 70. One end of a rod 72 is pivotally mounted in the slot 70, the rod 72 being affixed at the other end to a button 74 which operates in a cylinder 76. The cylinder 76 is slidable within fixed cylindrical wall 77. Springs 78 and 80 provided on opposite sides of the cylinder 76 bias the cylinder to a position such that the button tends to be located in an intermediate position therein. As shown, the springs contact a pair of plates 82 and 84 located on opposite sides of the button 74 and abutment 86. The rod 72 extends through a central opening in the plate 84. The cylinder 76 has a rod 88 affixed thereto which actuates the cylinder in accordance with an input signal to the device of the invention, the rod 88 being pivotally connected, as for example, at 90 in a slot 91 located in one end of an input lever 92, the lever 92 being pivoted at an intermediate location 94 on a fixed structure.

In the operation of the device, ring 64 is actuated by the feedback connection extending from the output gear to the ring, to cause the frictional surface 68 to alternately engage and disengage the spring 18. When the frictional surface 68 of the ring 64 is out of engagement with the spring 18, the spring is expanded against surface 22 of fixed ring 20 and surface 23 of slot 24 such that the shaft extension 26 is locked by the spring to the fixed ring thereby preventing shaft 28 and the spider 30 from moving. At this time the input drive shaft 10 drives the output shaft 42 through gears 12, 14, 38, 34, 36 and 40 at constant speed. Gear 44 on the output shaft drives the gear wheel 46 such as to advance the jack screw 48 in a direction which causes the frictional surface 68 of the ring 64 to contact the spring 18. The direction of movement of the jack 48 and feedback link 54 is to the left as shown in the drawing, the result being that differential link 58 is pivoted counterclockwise about the pivotal connection at 70 causing ring extension 62 and the ring 64 to be moved to the left on shaft 16 so as to bring frictional surface 68 into engagement with the spring end. The ring 64 is rotated continuously by the shaft 16 in the direction for winding the spring 18 and when frictional surface 68 engages the spring, the spring is wound away from the fixed ring and into tight engagement with shaft 16 and the inside surface 25 of slot 24. This ties the shaft 16 through the spring and extension 26 to the shaft 28 such that the shaft 28 and rod 32 are caused to rotate with the shaft 16. The rod 32 drives the gears 34 and 36 about the axial line of shaft 28, and the net effect is that the direction of rotation of output shaft 42 is reversed. The output shaft rotates at the same speed regardless of the direction of rotation.

As a consequence of the reversal in direction of motion of output shaft 42, a reversal also occurs in the direction of movement of jack screw 48 and of differential link 58. The direction of movement of extension 62 and ring 64 is also reversed such that the friction surface 68 of the ring is moved away from the spring 18 whereupon the spring expands away from the shaft 16 and into contact with the fixed member 20 and outside surface 23 of slot 24. This ties the shaft 28 to the ring 20, but the shaft 16 continues to rotate to again reverse the direction of motion of the output shaft, thereby starting a new ouput cycle.

The oscillatory motion which occurs continuously while the device is connected to a power source has the advantage of maintaining the mechanism in a dynamically fluid state. Also, inasmuch as power for driving the output shaft is derived from a constant driving source, delays due to inertia effects are minimized such that the device is always capable of responding almost immediately to an input signal. The duration of a cycle of operation is determined by the time required for the transmission around the closed loop of the device of a controlled impulse initiated by engagement of the frictional surface 68 of the ring 64 with the spring 18, calling for an output in one direction, plus the time required for the transmission of a subsequent controlled impulse caused by the disengagement by the frictional surface from the spring calling for an output in the other direction.

A net output movement is obtained from the device by lengthening or shortening the time required for a controlled impulse to travel around the loop. This is accomplished with an input signal to the differential. The input signal is introduced by movement of rod 88. Movement of the rod 88 acts through the signal rate limiter to actuate the rod 72. This causes differential link 58 to pivot about the pivotal connection 56 on the feedback link 54, and tends to move the pivotal connection in the slot 60 to the right or left according to whether the input rod is moved to the right or left respectively. Motion of the rod 88 is transmitted to the differential link 58 through the cylinder 76, spring 78 or 80, plate 82 or 84, button 74 and rod 72. The rates of movement of the rod 72, link 58, extension 62 and ring 64 are limited by the spring 78 or 80 depending upon the direction of the input signal. The maximum rate at which the ring 64 may be moved by the input signal is limited to the rate at which the ring may be moved by the feedback signal in the device. By virtue of the signal rate limiting means, the ring moves only the very slight distance required to engage and disengage the spring during operation of the device. Excessive movement of the ring, resulting in breakage of parts which could otherwise occur with an input signal rate greater than the feedback rate, is prevented.

Assume that input lever 92 is moved in one direction, as for example to the right as shown in the drawing, such that rods 88 and 72 are caused to move to the left. This has the effect during each cycle of operation of maintaining the frictional surface 68 on ring 64 in engagement with spring 18 for a longer time than it would be in the absence of an input signal, and of shortening the time during which the frictional surface is out of engagement with the ring. As a result a net rotational movement of shaft 42 in a direction consistent with the engagement of the frictional surface 68 with the spring occurs during each cycle. The net movement over a period of time depends upon the input signal rate and the frequency at which the device oscillates in the absence of an input signal.

Movement of input lever 92 to the left has the effect during each cycle of operation of shortening the period of engagement of the frictional surface 68 with the spring 18, and of lengthening the period during which the frictional surface and spring are out of engagement. The result is a net rotational movement of output shaft 42 in a direction opposite from that caused by the movement of input lever 92 to the right. Normally the input signal rate will be considerably less than the feedback signal rate, and the result is a step output. As the input signal rate is increased however, the step type output is transformed into a smoother output, until the step character is completely eliminated at an input signal rate equal to the feedback rate.

Movement of the output shaft 42 follows very close on the heels of an input signal. The maximum amount of time, for an input signal at the ring 64 to be reflected in the output is equal only to the time required for a signal to travel through the feedback portion of the closed loop of the device.

In most instances this "dead time" will be of less duration depending upon when during an operative cycle the input signal is introduced. As indicated hereinbefore inertia effects are minimized and substantial delays in response such as occur in most servo devices from this cause do not result.

The oscillatory motion which occurs at the output shaft 42 in the absence of an input signal need not appear at a load connected to the device. The oscillations may, for example be damped out in shafting connecting the output shaft with the load provided the shafting has the required flexibility for this purpose. In this event motion is imparted to the load only when an input signal is fed to the device.

As noted hereinbefore, the device is a power amplifier and only a small force representing an input signal at input lever 92 is required to position a load of substantial magnitude connected to the output shaft 42. This is so since the output shaft is driven by the input shaft 10 and the input shaft may be connected to any power source sufficient to accomplish the job.

Although only one form of the invention has been shown in the drawings and described herein, it will be understood that various changes and modifications may be made thereto by one skilled in the art without departing from the spirit and scope of the invention. I aim to cover all such changes and modifications in the appended claims.

I claim:
1. A servomotor comprising a power input member, a first member continuously driven in one direction by the power input member, a second member, spring clutch and brake means operable to drivably connect said second member to the first member or to secure the second member in a fixed position, an output member, means connecting the first and second members with the output member for causing the output member to be driven in one direction or another according to whether the second member is connected to the first member or is secured in a fixed position, and a feedback connection between the output member and spring clutch and brake means responsive to output motion in one direction or another to operate the clutch and brake means so as to bring about reversals in the direction of motion of the output member and thereby provide an oscillating output motion.

2. A servomotor comprising a power input member, a first rotatable member continuously driven in one direction by the power input member, a second rotatable member, fixed structure, a spring connected to the second member expandable into engagement with the fixed structure for securing the second member, spring actuating means for disengaging the spring from the fixed structure and wrapping said spring on the first member to drivably connect the first and second members, an output member, means connecting the first and second members with the output member for causing the output member to be driven in one direction or another according to whether the second member is drivably connected to the first member or is secured to the fixed structure, and a feedback connection between the output member and spring actuating means responsive to output motion in one direction or another for controlling the actuating means to bring about reversals in the direction of motion of the output member and thereby provide an oscillating output motion.

3. A servomotor comprising a power input member, a first member continuously driven in one direction by the power input member, a second member, spring clutch and brake means operable to drivably connect said second member to the first member or to secure the second member in a fixed position, an output member, means connecting the first and second member with the output member for causing the output member to be driven in one direction or another according to whether the second member is connected to the first member or is secured in a fixed position, a feedback connection between the output member and spring clutch and brake means responsive to output motion in one direction or another to operate the clutch and brake means so as to bring about reversals in the direction of motion of the output member and thereby provide an oscillating output motion, and input signal means operatively connected to the clutch and brake means for operating the clutch and brake means to produce net movement of the output member in a desired direction.

4. A servomotor comprising a power input member, a first member continuously driven in one direction by the power input member, a second member, spring clutch and brake means operable to drivably connect said second member to the first member or to secure the second member in a fixed position, spring actuating means, an output member, means connecting the first and second members with the output member for causing the output member to be driven in one direction or another according to whether the second member is connected to the first member or is secured in a fixed position, a feedback connection between the output member and spring actuating means responsive to output motion in one direction or another to operate the clutch and brake means so as to bring about reversals in the direction of motion of the output member and thereby provide an oscillating output motion, input signal means, and a differential operatively connected to the input signal means, the spring actuating means and the output member for controlling the spring actuating means according to the combined motion of the input signal means and the output member.

5. The combination as defined in claim 4 wherein the input signal means includes mechanism for limiting the input signal rate to the differential.

References Cited in the file of this patent

UNITED STATES PATENTS

| 1,983,835 | Barton et al. | Dec, 11, 1934 |
| 2,453,173 | Wright | Nov. 9, 1948 |
| 2,768,757 | Barry | Oct. 30, 1956 |
| 2,775,133 | Armantrout | Dec. 25, 1956 |
| 2,886,985 | Meyer | May 19, 1959 |

FOREIGN PATENTS

| 697,932 | Germany | Sept. 26, 1940 |